Apr. 10, 1923.
O. EPPENSTEIN
1,450,915
STEREOSCOPIC TELEMETER
Filed Aug. 13, 1921
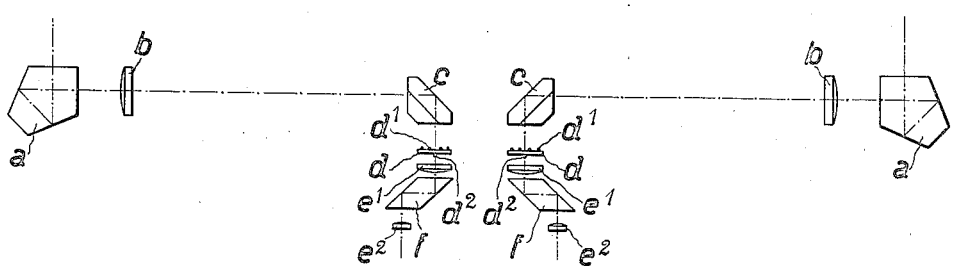
Inventor:
Otto Eppenstein Patented Apr. 10, 1923.

1,450,915

UNITED STATES PATENT OFFICE.

OTTO EPPENSTEIN, OF JENA, GERMANY, ASSIGNOR TO THE FIRM OF CARL ZEISS, OF JENA, GERMANY.

STEREOSCOPIC TELEMETER.

Application filed August 13, 1921. Serial No. 492,102.

(GRANTED UNDER THE PROVISIONS OF THE ACT OF MARCH 3, 1921, 41 STAT. L., 1313.)

*To all whom it may concern:*

Be it known that I, OTTO EPPENSTEIN, a citizen of the German Empire, residing at Jena, Germany, have invented a new and useful Stereoscopic Telemeter (for which I have filed an application in Germany January 12, 1917, Patent 298,536, and in Austria April 8, 1918), of which the following is a specification.

The present invention relates to a stereoscopic telemeter, provided with stereoscopic measuring marks, with the apparent distance of which during the measurement the apparent distance of the spatial image of the object to be measured, presented by the telemeter, is compared. If it be desirable to test such a telemeter with regard to the correctness of its indications by observing with it a pair of marks set up near the telemeter, the distance apart of these marks being equal to the base-line of the telemeter and their connecting line being parallel to the said base-line, and by ascertaining whether the apparent distance of the spatial image produced from these two marks be the same as the apparent distance of those of the stereoscopic measuring marks which belongs to the range value "infinite," certain drawbacks will arise. The two images of the two marks produced by the objectives of the telemeter (owing to the comparatively short distance of these marks) will then appear considerably behind the focal plane of the respective objective, whilst the marks, from which the stereoscopic measuring marks are produced, (owing to the comparatively long distance of the objects to be observed with the proper use of the telemeter) must be situated in the focal plane of the respective objective. On account of the said difference in the position the test is therefore not only difficult but under certain circumstances it also runs the risk of being faulty.

According to the invention the said drawbacks are obviated by presenting for the test of the telemeter a stereoscopic subsidiary mark, produced from two marks which are disposed each behind the focal plane of the appertaining objective. With a suitable selection of the distance between these marks and the focal planes of the objectives, the marks will then be situated just as far behind the objectives as the above mentioned images of the marks disposed in front of the telemeter for testing it, so that the source of the aforesaid drawbacks does not exist any more. It is immaterial whether the marks producing the subsidiary marks are rigidly disposed at their place or whether they are so disposed as to be made operative or inoperative. The latter case can also be realized by adjustably disposing the marks producing the measuring marks in such a way that they may be shifted by a certain amount behind the focal plane for the purpose of the above mentioned test.

It is understood that the deficiency described above also exists and is also removed by the invention in case the telemeter does not present to the observer a number of marks fixed at a different apparent distance but a single stereoscopic mark, the apparent distance of which is variable.

The annexed drawing shows as a constructional example the plan elevation of the optical system of a telemeter corresponding to the invention.

Behind each of the two objective prisms $a$, an objective $b$ is disposed. The ocular-prism system consists of two ridge-edged prisms $c$, behind each of which a plano-parallel glass-plate $d$ is disposed. The field-lens of each of the two oculars is marked $e^1$ and the eye-lens $e^2$. Between the field lens and the eye-lens there is a double reflecting prism $f$ with a rhombic chief intersection, in order to allow of adapting in a known way the distance apart of the axes of inspection to the interocular distance of the observer. The front each of the glass plates $d$ coincides with the focal plane of the appertaining objective. Each of the glass plates contains on its front a number of marks $d^1$ which along with those of the other glass plate produce with binocular observation a number of stereoscopic marks, serving for measurements. On the back of each of the glass plates $d$ there is a mark $d^2$; the two marks $d^2$ produce with binocular observation the subsidiary mark, serving for the test of the telemeter.

I claim:

In a stereoscopic telemeter containing two objectives, stereoscopic measuring marks arranged in the focal planes of the said objectives and two oculars for observing both the object, the distance of which is to be measured, and the measuring marks, and two other marks disposed each behind the focal plane of the appertaining objective for producing a subsidiary stereoscopic mark.

OTTO EPPENSTEIN.

Witnesses:
PAUL KRÜGER,
RICHARD HAHN.